(12) United States Patent
Guo et al.

(10) Patent No.: US 10,558,714 B2
(45) Date of Patent: Feb. 11, 2020

(54) TOPIC RANKING OF CONTENT ITEMS FOR TOPIC-BASED CONTENT FEEDS

(71) Applicant: Facebook, Inc., Menlo Park, CA (US)

(72) Inventors: Shengbo Guo, San Jose, CA (US);
Annie Hsin-Wen Liu, Fremont, CA (US); David Vickrey, Mountain View, CA (US); Khalid Bakry El-Arini, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 584 days.

(21) Appl. No.: 15/393,150

(22) Filed: Dec. 28, 2016

(65) Prior Publication Data

US 2018/0181572 A1  Jun. 28, 2018

(51) Int. Cl.
*G06F 16/951* (2019.01)
*G06F 16/9535* (2019.01)

(52) U.S. Cl.
CPC ........ *G06F 16/951* (2019.01); *G06F 16/9535* (2019.01)

(58) Field of Classification Search
CPC ... G06F 16/951; G06F 16/9535; G06F 16/358
USPC .......................................................... 707/728
See application file for complete search history.

(56) References Cited

U.S. PATENT DOCUMENTS

| | | | | |
|---|---|---|---|---|
| 8,301,623 B2* | 10/2012 | Chakrabarti | ........ | G06F 16/9535 707/723 |
| 8,626,768 B2* | 1/2014 | Bailey | ................... | G06F 16/358 707/738 |
| 8,825,758 B2* | 9/2014 | Bailor | ..................... | G06F 17/24 709/204 |
| 9,058,332 B1* | 6/2015 | Darby | ................. | G06F 16/2228 |
| 9,129,227 B1* | 9/2015 | Yee | ....................... | G06F 16/335 |
| 9,372,592 B1* | 6/2016 | Goodspeed | ........... | G06F 3/0481 |
| 9,489,458 B1* | 11/2016 | Haugen | ................. | G06F 16/951 |
| 2010/0146443 A1* | 6/2010 | Zuckerberg | ........... | H04L 67/306 715/810 |
| 2011/0022602 A1* | 1/2011 | Luo | ........................ | G06Q 10/10 707/748 |
| 2013/0211910 A1* | 8/2013 | Yerli | .................. | G06Q 30/0251 705/14.53 |
| 2013/0246521 A1* | 9/2013 | Schacht | ................. | G06Q 50/01 709/204 |
| 2013/0311572 A1* | 11/2013 | Faller | .................... | H04L 65/403 709/204 |

* cited by examiner

*Primary Examiner* — Shahid A Alam
(74) *Attorney, Agent, or Firm* — Fenwick & West LLP (57) ABSTRACT

An online system ranks topic-groups for users and presents content items in topic-based feeds. A topic group corresponds to one or more topic(s) and can be used to generate a feed for presenting the content items related to the topic(s). For a particular user, the topic groups are ranked according to the likelihood of the user interacting with content items included in the topic groups. The topic groups are ranked using information of the users and/or users' historical interaction data such as click-based interaction data, post-based interaction data, or engagement-based interaction data. The online system generates and provides a user interface for presenting the topic groups to the client device. Content items that are related to the topic(s) corresponding to the topic group are presented in each topic-based feed such that the user can switch between different topic-based feeds.

18 Claims, 4 Drawing Sheets

TOPIC RANKING OF CONTENT ITEMS FOR TOPIC-BASED CONTENT FEEDS

BACKGROUND

1. Field of Art

This description generally relates to ranking content items, and particularly to ranking content items based on session specific information of a client device for presentation of topic-based content feeds.

2. Description of the Related Art

An online system allows its users to connect to and communicate with other users of the online system. Users may create user profiles on the online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for individuals or third parties to share different types of content.

A social networking system is one example of an online system that allows its users to post content to the social networking system for presentation to other social networking system users, allowing the users interact with each other. Examples of content items include stories, photos, videos, and invitations. Additionally, the social networking system typically generates content items describing actions performed by users and identified by the social networking system. For example, a content item is generated when a user of a social networking system checks into a location, shares content posted by another user, or performs any other suitable interaction. The social networking system presents content items describing an action performed by a user to additional users connected to the user via the social networking system. Typically, the social networking system presents content items to users in a feed in an order based on times when content items are generated or received by the social networking system and also based on anticipated interest of the user in the content items.

Over time, users are presented with a large volume of content items including a mixture of content items covering a variety of topics. Users looking to read about a particular topic may expend significant time navigating through multiple content items to locate content items on that topic.

SUMMARY

An online system provides a mechanism for users to have access to feeds of content that are organized according to topics or topic groups of interest to the user. The online system determines which topic groups are of interest based on various user data for the user, such as data from a user profile indicating topics of interest to the user and social interactions by the user with content items or with other users indicating interest in topics. One or more classifiers or machine learning models are trained to predict the probability that certain topics are of interest to the user and/or to predict the probability that a user, after visiting a feed on a topic, will revisit that feed on that topic. The classifier(s) output one or more scores that are used (or combined) to rank the topics for the user, and topics can be actively reordered or replaced with other topics by the online system over time based on continued tracking of user data and application of the classifier(s). A user interface including a feed of content items is provided to the user with one or more user interface elements (e.g., tabs) corresponding to different topic groups. A user can select a user interface element to switch between different feeds, where the feed for a user interface element includes content items focused on the topic group.

In one embodiment, a computer-implemented method including an online system receiving a plurality of topic groups, each topic group corresponding to one or more topics, each topic group including content items that are tagged to that topic group. The online system further retrieves user data of a user relating to one or more of the topic groups. The online system determines a probability of the user interacting with content items tagged to the topic group for each topic group by applying one or more trained classifiers to the user data of the user. The online system ranks the plurality of topic groups for the user according to the determined probability for the plurality of topic groups. The online system generates a user interface including a feed of content items selected for the user for provision to a user device of the user, the user interface including one or more user interface elements corresponding to at least one of the plurality of topic groups that were ranked higher than other topic groups for the user. The online system selects a set of content items for the user that are tagged to the topic group of each of the one or more user interface elements. The online system provides for display the generated user interface with the feed of content items to the user device of the user. The online system provides for display to the user a different feed that comprises the selected set of content items tagged to the topic group for the selected user interface element, in response to receiving a selection by the user of one of the user interface elements.

BRIEF DESCRIPTION OF DRAWINGS

Figure (FIG. 1 is a diagram of a system environment for providing and ranking content items according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
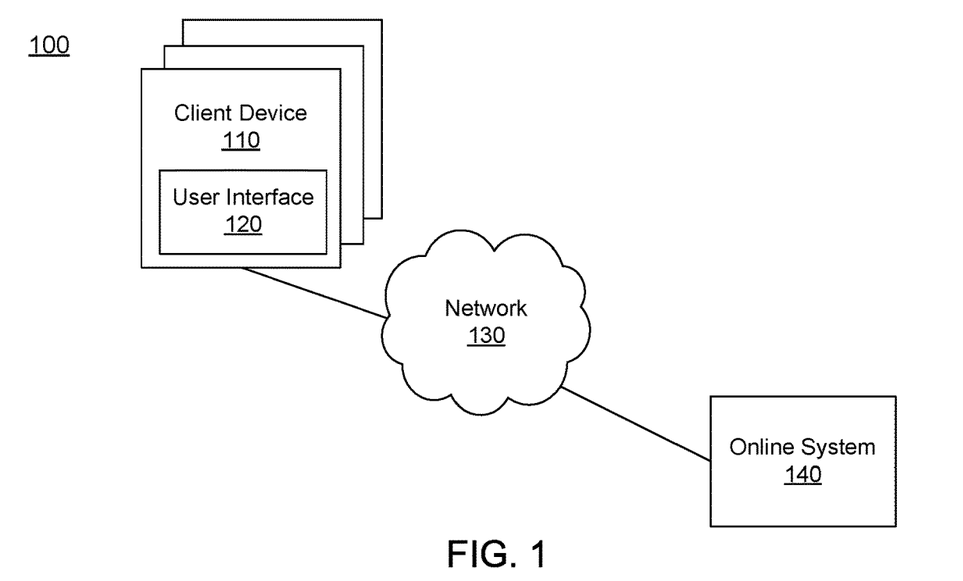

Figure (FIG. 1 is a diagram of a system environment 100 for ranking topics and presenting content items according to the ranked topics according to one embodiment. The system architecture includes one or more client devices 110 connected to an online system 140 via a network 130. In other embodiments, different and/or additional entities can be included in the system environment 100.

The client device 110 is a computing device capable of receiving user input as well as transmitting and/or receiving data via the network 130. A client device 110 is a device having computer functionality, such as a smartphone, personal digital assistant (PDA), a mobile telephone, or another suitable device. A client device 110 is configured to communicate via the network 130. In one embodiment, a client device 110 executes an application allowing a user of the client device 110 to interact with the online system 140. For example, a client device 110 executes a browser application to enable interaction between the client device 110 and the online system 140 via the network 130. In another embodiment, a client device 110 interacts with the online system 140 through an application programming interface (API) running on a native operating system of the client device 110, such as IOS® or ANDROID™. The client device 110 also includes a user interface 120 that allows a user to interact with the client device 110. Via the user interface 120, a user can further interact with the online system 140. The client device 110 can execute an application associated with the online system 140 and present the user interface 120 based on information received from the online system 140.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (Wi-MAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The online system 140 includes a computing environment that allows users of the online system 140 to communicate or otherwise interact with each other and access content. The online system 140 stores information about the users, for example, user profile information and information about actions performed by users on the online system 140. Based on the stored information, the online system 140 ranks, selects, and/or generates topic groups based on which content items are ordered and presented to a user. Content items include information from the online system 140, e.g., stored user profile information, user action information, or information from objects in general stored on the online system 140. Content items may also include sponsored content provided by a third party outside of the online system 140. Content items can include any combination of text, different types of media (e.g., images and videos), or universal resource locators (URL). In an embodiment, the online system 140 ranks topic groups for users.

A topic group corresponds to one or more topic(s) and can be used to generate a feed for presenting the content items related to the topic(s). For a particular user, the topic groups are ranked according to the probability of the user interacting with content items included in the topic groups. The topic groups are ranked using information of the users and/or users' historical interaction data such as click-based interaction data, post-based interaction data, or engagement-based interaction data. The online system 140 may periodically update the ranking of the topic groups. In addition, the online system 140 can generate new topic groups or remove topic groups from the list. The online system 140 provides the content items to the client device 110 in response to receiving a request for content items from the client device 110. The online system 140 generates and provides a user interface for presenting the topic groups to the client device 110. The user interface is configured such that user interface elements for the topic groups are arranged according to the ranked order. The online system 140 identifies and retrieves content items for inclusion in a topic group. The online system 140 provides the content items for presentation in a topic-based feeds to a client device 110 in response to a request.

Online System

Figure 2:
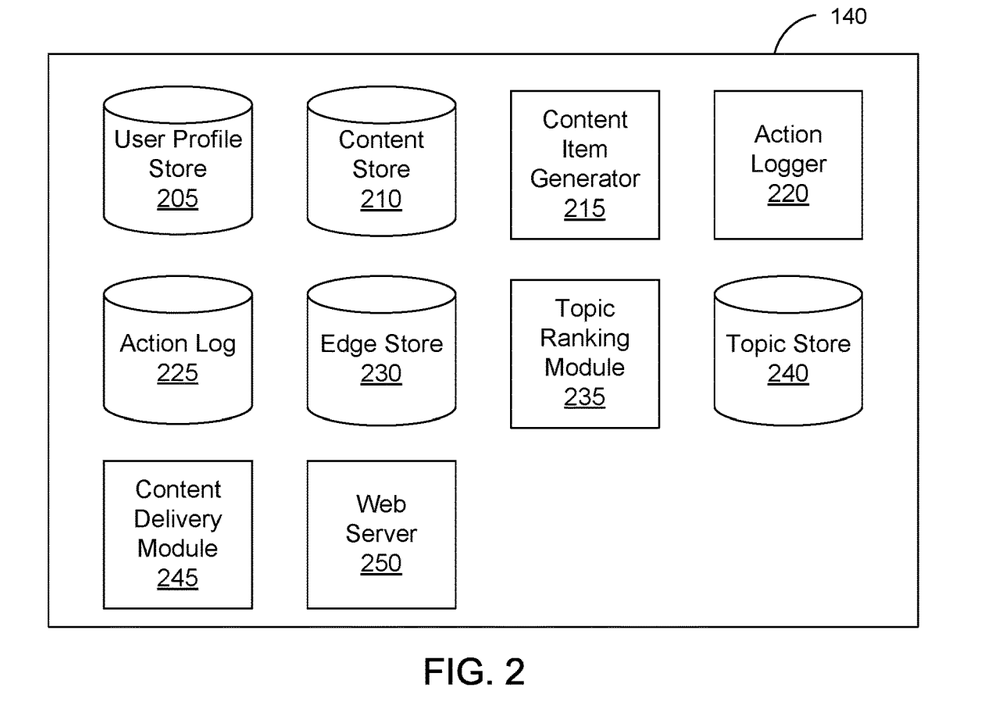
FIG. 2 is a block diagram of a system architecture of an online system according to one embodiment.

FIG. 2 is a block diagram of a system architecture of the online system 140 according to one embodiment. The online system 140 includes a user profile store 205, a content store 210, a content item generator 215, an action logger 220, an action log 225, en edge store 230, a topic ranking module 235, a topic store 240, a content delivery module 245, and a web server 250. In other embodiments, the online system 140 includes additional, fewer, or different components for various applications. In an embodiment, the online system is a social networking system that allows users to establish connections with other users and interact with the other users. Such online system provides content items to a user as news feed describing actions performed by other users connected to the user. Conventional components such as network interfaces, security functions, load balancers, failover servers, management and network operations consoles, and the like are not shown so as to not obscure the details of the system architecture.

The user profile store 205 stores user profiles associated with each user of the online system 140. A user profile includes declarative information about the user that was explicitly provided by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on the online system 140. The user profile store 205 further stores data describing one or more relationships between different users and allows users to specify their relationships with other users, e.g., the user's connections. For example, these user-defined relationships allow users to generate relationships with other users that parallel the user's real-life relationships, such as friends, co-workers, partners, and the like.

The content store 210 stores objects that each represent various types of content. Examples of content represented by an object include a page post, a status update, a photograph, a video, a link, a shared content item, a gaming application achievement, a check-in event at a local business, a brand page, or any other type of content. In one embodiment, objects in the content store 210 represent single pieces of content, or content "items." Hence, users of the online system 140 are encouraged to communicate with each other by posting text and content items of various types of media to the online system 140 through various communication channels. This increases the amount of interaction of users with each other and increases the frequency with which users interact within the online system 140.

The content item generator 215 generates content items for presentation to users of the online system 140. The content item generator 215 can analyze information stored in the user profile store 205 or in the action log 225 to identify information useful for generating content items. Based on the analyzed information, the content item generator 215 generates content items for users. For example, in response to users' requests to create content items such as status updates, photos tagged by users to be associated with other objects in the social networking system, events, groups or applications, the content item generator 215 generates the content items as requested by the users. The content item generator 215 may also receive content items from external systems such as third-party applications separate from the online system 140. The content item generator 215 stores the generated content items in the content store 210.

In some embodiments, the content item generator 215 determines one or more topics associated with objects in the content store 210. The content item generator 215 may receive topic tags provided by users of the online system 140 or analyze content of the content items to determine the topics. When creating a content item, a user of the online system 140 can associate the content item with one or more topic tags identifying the topic(s) associated with the content item. The content item generator 215 may also identify anchor terms included in a content item and determines a meaning of the anchor terms as further described in U.S. application Ser. No. 13/167,701, filed Jun. 24, 2011, which is hereby incorporated by reference in its entirety. The content item generator 215 may also use structured information associated with a content item to extract a topic associated with the content item. For a particular content item, the content item generator 215 associates the determined topics(s) with an object identifier corresponding to the content item and stores the determined topic(s). Associations between object identifiers and topics (e.g., topics stored in the topic store 240) are stored in the content store 210 to simplify retrieval of one or more topics associated with an object identifier or retrieval of object identifiers associated with a specified topic.

The action logger 220 receives communications about user actions internal to and/or external to the online system 140, populating the action log 225 with information about user actions. Examples of actions include adding a connection to another user, sending a message to another user, uploading an image, reading a message from another user, viewing content associated with another user, or attending an event posted by another user. In addition, a number of actions may involve an object and one or more particular users, so these actions are associated with those users as well and stored in the action log 225.

The action log 225 may be used by the online system 140 to track user actions on the online system 140, as well as actions on third party systems that communicate information to the online system 140. Users may interact with various objects on the online system 140, and the action logger 220 stores information describing these interactions in the action log 225. Examples of interactions with objects include: posting posts, commenting on posts, sharing links, and checking-in to physical locations via a client device, accessing content items, and any other interactions. Additional examples of interactions with objects on the online system 140 that are stored in the action log 225 include: posting a photo album, commenting on a photo album, communicating with a user, establishing a connection with an object, joining an event to a calendar, joining a group, creating an event, authorizing an application, using an application, expressing a preference for an object ("liking" the object) and engaging in a transaction.

Additionally, the action log 225 may record a user's interactions with sponsored content on the online system 140 as well as with other applications operating on the online system 140 if the online system 140 has been granted access. In some embodiments, data from the action log 225 is used to infer interests or preferences of a user, augmenting the interests included in the user's user profile and allowing a more complete understanding of user preferences and types of content items that the user would likely to interact with. The action log 225 can record information about client devices 110 that users use to interact with the online system 140. For example, the action log 225 records whether the user used a laptop computer or smartphone to interact with the online system 140. Further, the action log 225 may include information about the types of client devices 110, e.g., smartphone running an IOS® or ANDROID™ operating system.

The action log 225 may also store user actions taken on third party systems, such as an external website, and communicated to the online system 140. For example, the external website may recognize a user of the online system 140 through a social plug-in enabling the external website to identify the user of the online system 140. Since users of the online system 140 are uniquely identifiable, external websites may communicate information about a user's actions outside of the online system 140 to the online system 140 for association with the user. Hence, the action log 225 can record information about actions that users perform on a third party system including webpage viewing histories, sponsored content that were engaged, purchases made, and other patterns from shopping and buying.

The edge store 230 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Multiple interactions between a user and a specific object may be stored as a single edge in the edge store 230, in one embodiment. Alternatively, each interaction between a user and a specific object is stored as a separate edge. In some embodiments, connections between users may be stored in the user profile store 205, or the user profile store 205 may access the edge store 230 to determine connections between users.

In one embodiment, the edge store 230 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Example features describing a content item include a topic of the content item (e.g., a topic related to sports, food, travel, or entertainment), a type of media included in the content item (e.g., a photo of a beach or a video of a concert), users associated with the content item (e.g., which user posted the content item or which user was tagged in the content item), or the popularity of the content item (e.g., based on a number of likes or comments received by users). Example features describing a user include a topic of content items that the user frequently interacts with (e.g., the user frequently interacts with content items about basketball, baseball, or football because the user is a sports fan), a type of media included in content items that the user frequently views (e.g., videos of movie trailers or cooking tutorials), or user profile information of the user (e.g., the user's demographic information or brand pages that the user has liked).

The topic ranking module 235 ranks a list of topic groups for users of the online system 140. Topic groups provide a basis for organizing and presenting content items. A topic group corresponds to one or more topics. Content items can be organized into topic groups according to their topics, and hence can be tagged to these topic groups. A topic-based feed can be generated for presenting content items related to the topic(s) to users. For example, fitness, health, politics, news, pets, music, etc. are examples of topics. A topic group of "fitness & health" includes content items related to the topics of fitness and health. The list of topic groups may be predetermined or determined by the topic ranking module 235 as further described below. For a particular user, the topic groups are ranked based on the user's interest levels towards the topic groups. In various embodiments, the topic ranking module 235 estimates the user's interest level by determining a probability of the user interacting with the topic group with which the user may have previously interacted or have never interacted. The probability of the user interacting with the topic group thus includes a probability of the user interacting with a topic group for the first time and a probability of the user, after interacting with the topic group, will continue interacting with the topic group. As described herein, a user interacts with a topic group refers to a user interacts with a content item of the topic group such as clicking on the content item, posting the content item, viewing the content item, playing the content item, and the like.

The topic ranking module 235 considers various factors when determining probability of a user interacting with a topic group. As one example, the topic ranking module 235 considers user information of a user. User information can be analyzed to identify users' characteristics and to predict users' interests and possible behaviors. The topic ranking module 235 considers correlations between characteristics of users and the users' preferences in topics when determining probability of the users interacting with the content items. Users having certain characteristics are more likely to be interested (or disinterested) in a particular topic and thus more (or less) likely to interact with the corresponding topic group. Example user information that is considered includes a user's demographic information (e.g., age, age range, gender, or education level of users), geographical location, fans (or followers) of the user, fans (or followers) of content items of the user, other users or content items that the user follows or is a fan of, and the like.

As another example, the topic ranking module 235 considers users' historical interaction information such as click-based interaction information. A user's past behavior is a good predictor of the user's future behavior. Click-based information can be analyzed to determine whether or not a user has interacted with content items related to a topic and to identify a rate of users' interaction. The topic ranking module 235 considers correlations between the users' click-based interaction with content items and the users' preference in topics when determining probability of the users interacting with topic groups. Users that have interacted with content items related to a topic are more likely to be interested in the topic and thus more likely to interact with the corresponding topic group. Conversely, users who have never interacted with content items related to a topic will almost not interact with the corresponding topic group. Typically, users interact with content items related to topics in which they are more interested at a higher rate than those related to topics in which they are less interested. In addition, users that have interacted with content items related to a topic are more likely to be interested in similar topics and more likely to interact with topic groups corresponding to those similar topics. Example click-based interaction information that is considered includes clicking on a content item, indicating a preference (e.g., like, or dislike) for a content item, sharing a content item with another user, commenting on a content item, a type (e.g., page post, post, event, video, photo, link, question, text, etc.) of the content item that the user interacted with, a topic of the content item that the user interacted with, tokens (e.g., topic tags) that the user used, for example, in a determined time period (e.g., in the past 28 days), and the like.

As a further example, the topic ranking module 235 considers users' historical interaction information such as post-based interaction information. Post-based information can be analyzed to determine whether or not a user has interacted with content items related to a topic by posting the content items and to identify a rate of users' interaction. The topic ranking module 235 considers correlations between the users' post-based interaction with content items and the users' preference in topics when determining probability of the users interacting with topic groups. Users that have posted content items related to a topic are more likely to be interested in the topic and thus more likely to interact with the corresponding topic group. Conversely, users who have never posted content items related to a topic will almost not interact with the corresponding topic group. Typically, users post content items related to topics in which they are more interested at a higher rate than those related to topics in which they are less interested. In addition, users that have posted content items related to a topic are more likely to be interested in similar topics and more likely to interact with topic groups corresponding to those similar topics. Example post-based interaction information that is considered includes posting a content item, a type (e.g., page post, post, event, video, photo, link, question, text, etc.) of the content item that the user posted, a topic of the content item that the user posted, tokens (e.g., topic tags) that the user used, for example, in a determined time period (e.g., in the past 28 days), and the like.

Yet a further example, the topic ranking module 235 considers users' historical interaction data such as engagement-based interaction information. Engagement-based information can be analyzed to evaluate a level and a quality of users' engagement with content items that are related to a topic. The topic ranking module 235 considers correlations between the users' engagement-based interaction with content items and the users' preference in topics when determining probability of the users interacting with the topic groups. The topic ranking module 235 considers correlations between the users' engagement with different content items related to different topics and the users' preference in topics when determining probability of the users interacting with the content items. Typically, users that have been more engaged with content items related to a topic are more likely to interact with the corresponding topic group or topic groups corresponding to similar topics. Example engagement-based interaction information includes an amount of time a user spends on interacting with a content item; an amount of time a user spends on interacting with a topic group, for example, in a given time period; a quantity of content items belonging to a topic group that the user interacts with, for example, in a given time period; a quantity of content items that a user has viewed or posted, for example, in a given time period; and the like. User information and users' interaction information can be obtained by retrieving user data including user information data and user interaction data from the user profile store 200 and/or action log 220.

The topic ranking module 235 applies one or more classifiers to predict probability of users interacting with topic groups. For a particular topic group, the one or more classifiers receive a user's user data (e.g., user information data, user interaction data) and output a classification of a probability of the user interacting with the particular topic. A classifier may output a first probability of the user interacting with a topic group for the first time, a second probability of the user continuing interacting with a topic group, or a probability that combines the first probability and the second probability. In some embodiments, a classifier is a binary classifier that outputs a classification that is either positive or negative. The positive classification indicates that the user will interact with a topic group (for the first time and/or recurrently) and the negative classification indicates that the user will not interact with a topic group (for the first time and/or recurrently). For example, a classifier classifies a particular topic group into a positive or negative classification given a user's demographic information, given content items that the user has clicked on in the past, given content items that the user has posted in the post, given the user's fans, given the topic tags (e.g., news, cooking, pets, art, health and fitness, etc.) that the user used, given the amount of time that the user has spent on content items related to the topic group and/or other topic groups, or given the quantity of content items related to the particular topic that the user has interacted with (e.g., viewed, posted, etc.), and the like.

A classifier associates an output classification with a confidence score that is a numerical value reflecting a degree of accuracy of the classification. The confidence score can be used to indicate a probability of the user interacting (or not) with a topic group (for the first time and/or recurrently). When multiple classifiers are used, a classification of a topic group is determined by combining individual classifiers' output classifications and the associated confidence scores. For example, each classifier is associated with a corresponding weight and the classification of the group is a weighted sum of the individual classifications with associated confidence scores. The topic ranking module 235 ranks the topic groups according to the determined classification and associated confidence scores. For each user, rankings of the topic groups can be associated with the topic groups and stored in the topic store 240.

The one or more classifiers observe correlations between probability of users interacting with topic groups and one or more factors as described above. A probability of a user interacting with a topic group includes a first probability of the user interacting with the topic group for the first time, a second probability of the user continuing interacting with the topic group, or a probability that combines the first and second probability. A classifier includes one or more features observing the one or more correlations. The topic ranking module 235 associates different weights with different features to allow different types of user data to differently affect the rankings of topic groups. The topic ranking module 235 trains the one or more classifiers using features extracted from training data. The training data includes user data of users for whom classifications of topic groups have been verified. Typically, the training data includes examples of users interacting with topic groups or indicating preferences towards topic groups. Examples of users indicating dislikes towards topic groups can also be included in the training data to train the classifiers. The training data can be retrieved from the user profile store 200, the action log 220, the content store 240, or provided by an expert to the online system 140. Since user data is constantly updating and new training data becomes available, the topic ranking module 235 can periodically retrain the one or more classifiers using updated training data.

The topic ranking module 235 may train the one or more classifiers by extracting features from user data representing different factors as described above and creating a feature vector. The topic ranking module 235 may also extract features from content items and topic groups representing different characteristics of content items and topic group sand creating a feature vector. Dimensionality reduction (e.g., via linear discriminant analysis, principle component analysis, etc.) may be used to reduce the amount of data in the feature vector to a smaller, more representative core set of features. Users' interest levels or rankings of example topic groups representing including particular features can also be included in the training data. The training process provides topic group classification and ranking models including one or more classifiers (and associated weights) that can be used to predict probability of users interacting with topic groups and to rank the topic groups based on the prediction. Each classifier includes one or more features (and associated weights.) In further embodiments, machine learning algorithms can be used such as support vector machines (SVMs), boosting for other algorithms (e.g., Ada-Boost), neural net, logistic regression, naïve Bayes, memory-based learning, random forests, bagged trees, decision trees, boosted trees, boosted stumps, etc. The accuracy of the trained topic group classification and ranking model is evaluated using a validation set that was formed as a disjoint set of the data for testing the trained topic group classification and ranking models to ensure the topic group classification and ranking model generalizes to non-training data. Common metrics applied in accuracy measurement include precision and recall may also be used to update the topic group ranking and classification models. For example, an accuracy measure that unifies the precision and recall can be used by the topic ranking module to reject or iterate on the model as needed.

As the topic ranking module 235 trains a topic group classification and ranking model over time with training data, the trained topic group classification and ranking model learns whether or not a given user is likely to interact with a particular topic group for the first time and whether or not the given user, after interacting with the topic group, will continue interacting with the topic group. For example, a user who is interested in health and fitness is likely to frequently views healthy recipes or training videos and is also likely to post work out status updates. Accordingly, a topic ranking module 235 can use the trained topic group classification and ranking model to determine more accurate predictions of probability of users interacting with topic groups and rankings of the topic groups.

The topic ranking module 235 also considers time periods (e.g., time of day, time of year, special occasion, seasons, and the like) when topic groups are to be presented when ranking the topic groups. That is, the one or more classifiers include a time period as a feature. Time periods when content items are to be presented can affect probability of users interacting with the topic groups. For example, a user is more likely to interact with content items related to gift ideas and promotions during holiday seasons. As a result, during holiday seasons, the topic ranking module 235 predicts that the user is more likely to interact with content items related to gift ideas and promotions. The topic ranking module 235 may further generate a new topic group based on the time period and determine a probability of a user interacting with the new topic group. The topic ranking module 235 suggests the new topic group to the user, for example, to create a corresponding topic-based feeds. In some embodiments, the new topic group is suggested to the user if the determined probability is greater than a predetermined threshold.

Users can adjust rankings of topic groups determined by the topic ranking module 235 and the topic ranking module 235 further considers users' adjustment when ranking the topic groups. The topic ranking models can be updated according to the users' adjustment to more accurately track the users' preferences in topic groups and thus more correctly rank the topic groups. For example, adding a new topic group indicates a user's preference towards the topic group, removing a topic group indicates a user's dislike toward the topic group, adjusting the order of ranking of two topic groups indicates a user's relative preference over the two topic groups, can be used to show the user's preference between the two topic groups. Users' adjustment can be included in the training data to train the topic group classification and ranking model.

The topic ranking module 216 re-ranks the topic groups for the users of the online system 140. The re-rank may be performed periodically or per users' requests. Because users' interests are likely to change over time, dynamically adjusting rankings of topic groups ensures more accurate topic rankings and that users can access their preferred content items over time. Moreover, topic ranking models can be refined using users' information and/or interaction data that are updated constantly, which also improve rankings of topic groups.

Lists of topic groups can be predetermined or customized for different users. The topic ranking module 216 can provide a plurality of possible topic groups from which a list of topic groups can be selected. The topic ranking module 216 or a user can select which topic groups to be included in the list. In some embodiments, the topic ranking module 216 can rank the possible topic groups and select a set of highest-ranked possible topic groups as the list of topic groups. The number of highest topic groups can be configured according to the system default setting or according to a user's configuration. The user can modify the selection. The topic ranking module 216 ranks the list of topic groups as described herein. The topic ranking module 216 can also determine and update the list of topic groups. For instance, the topic ranking module 216 generates new topic groups, for example, based on at least on trending popular topics. The topic ranking module 216 can add the new topic groups to the list or suggest the new topic groups to users for inclusions in the list. The topic ranking module 216 may predict a probability of a user interacting with a new topic group before adding the new topic group to the list or making the suggestion. The new topic group is added or suggested to the user for addition if the determined probability is greater than a threshold. For example, topic groups such as presidential elections, holiday shopping, Olympic Games, college admissions, wedding planning, and the like can be generated to reflect trending events. In addition, the topic ranking module 216 identifies topic groups that users rarely or never interact with from the list of topic groups. The topic ranking module 216 can remove or suggest the identified topic groups to users for removal from the list. For example, if the rate of a user interacting with a content item belonging to the topic group "real estate" is less than a threshold rate, the topic ranking module 216 removes or suggests for removal this topic group from the list of topic groups for this particular user. For a user, the topic ranking module 216 may further identify existing topic groups of which the determined probability of interacting below a threshold value (or the determined probability of not interacting above a threshold value) when ranking the topic groups. The topic ranking module 216 may remove these topic groups from the list or suggest to the user for removal of these topic groups.

The topic store 240 stores topic groups. The topic store 240 may further store lists of topic groups and rankings thereof for different users. In one embodiment, the lists of topic groups and rankings thereof are associated with user identifiers of the users. The topic store 240 may further store time values associated with the stored topic groups indicating when a topic group is included or removed from the list.

The content delivery module 245 delivers content items based on topics to users. In one embodiment, the content delivery module 245 receives a request from a client device 110 for content items. In response to the request, the content delivery module 245 retrieves and provides content items to the client device 110. For instance, in some embodiments, the content delivery module 245 retrieves the list of topic groups from the topic store 240, determines topics corresponding to the topic groups, and retrieves content items related to the topics from the content store 210. The content delivery module 245 organizes the retrieved content items according to the topic groups and presents the topic groups including the content items to the client device 110. In some embodiments, the content delivery module 245 receives the topic group included in the request and retrieves content items related to the topic from the content store 210. The content delivery module 245 presents the retrieved content items that are related to the topic to the client device 110.

In some embodiments, the content delivery module 245 creates a user interface including one or more user interface elements corresponding to one or more topic groups included in the list. A user interface element (e.g., icons, drop-down menus, tabs, etc.) for a topic group is configured to direct a user to a topic-specific feed corresponding to the topic group for users to access content items related to the corresponding topic(s). In the topic-specific feed, users can also create and publish content items which will be associated with the corresponding topic(s). In some embodiments, user interface elements may not be created for all topic groups included in the list. User interface elements are created for one or more highest-ranked topic group(s). A user or the online system (e.g., the content delivery module 245 or the topic ranking module 235) may configure a quantity of the topic groups for which user interface element(s) are created.

Figure 4A:
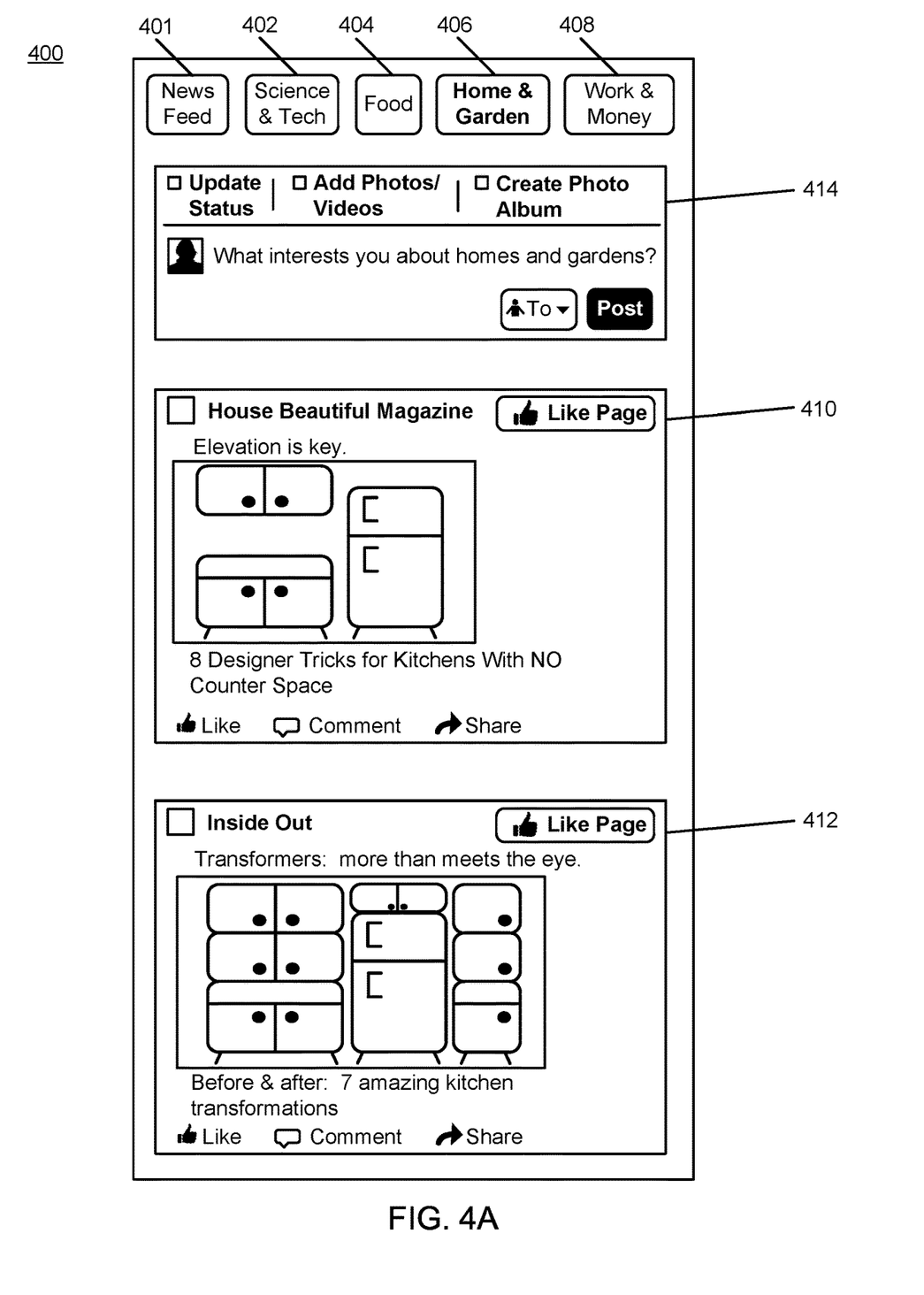
FIGS. 4A-B illustrate example user interfaces for presenting content items in topic-based feeds, according to one embodiment.

The user interface is configured such that the user interface element(s) for topic group(s) are presented according to a ranked order determined by the topic ranking module 235. For example, as illustrated in FIG. 4A, the user interface 400 includes tabs 402, 404, 406, 408 for topic groups "Science & Tech," "Food," "Home & Garden," and "Work & Money," respectively. The tabs 402, 404, 406, and 408 are displayed horizontally from left to right in a descending order of probability of the user interacting with the topic groups as ranked. The topic ranking module determines that the user is most likely to interact with topic groups "Science & Tech," "Food," "Home & Garden," and "Work & Money." Among them, the topic group "Science & Tech" is ranked highest, "Food" is ranked the second highest, "Home & Garden" is ranked the third highest, and "Work & Money" is ranked the lowest. When a tab 402, 404, 406 or 408 is activated, for example, by user actions such as clicking on, double-clicking, single-clicking, etc., directs the user to the corresponding feed. Here, the tab 406 has been activated (bolded), the feed "Home & Garden" including content items related to the topics of home and garden is presented. The icons 402, 404, and 408 are not activated (unbolded) and the feeds "Science & Tech," "Food," and "Work & Money" are hidden from view. The content delivery module 245 periodically re-configures the user interface since the ranking of topic groups is updated periodically. For example, the content delivery module 245 may adjust relative positions of user interface elements according to the updated ranked order. In addition, the content delivery module 245 may include in the user interface a new user interface element for a topic group that did not have corresponding user interface elements. For instance, when a new topic group is added to the list or included in the one or more highest-ranked topic groups, the content delivery module 245 creates a new user interface element corresponding to the new topic group. The content delivery module 245 may further remove from the user interface user interface elements for topic groups that are removed from the list or are no longer among the one or more highest-ranked topic groups. The user interface can be configured into other types of configurations that indicate to the user the ranked order of the topic groups. The content delivery module 245 may confirm with the user before adding or removing user interface elements. For example, user interface elements for higher ranked topic groups and for lower ranked topic groups can be configured to be visually distinguished. User interface elements for higher ranked topic groups are configured to be more visually noticeable than those for lower ranked topic groups. In some case, the user interface is configured such that user interface elements for lower ranked topic groups may be hidden unless the user interface is expanded by the user.

The content delivery module 245 may provide requests to the topic ranking module 235 to re-rank topic groups for a particular user. In one embodiment, the content delivery module 245 provides a request to the topic ranking module 235 after a predetermined duration of time has elapsed since the last time the content delivery module 245 provides content items to the client device for presentation. After the predetermined duration of time has elapsed, the online system 140 may have new information that the topic ranking module 235 can use to retrain topic ranking models. Thus, the topic ranking module 235 can use the re-trained topic ranking models to update the list of topic groups and/or to update rankings of the topic groups for each user. Based on the updated list of topic groups and/or updated rankings of topic groups, the content delivery module 245 modifies the user interface as well as topic-based feeds for presenting content items of different topic groups to the client devices 110.

The web server 250 links the online system 140 via the network 130 to the one or more client devices 110. The web server 250 serves web pages, as well as other web-related content, such as JAVA®, FLASH®, XML and so forth. The web server 250 may receive and route messages between the online system 140 and the client devices 110, for example, instant messages, queued messages (e.g., email), text messages, short message service (SMS) messages, or messages sent using any other suitable messaging technique. A user may send a request to the web server 250 to upload information (e.g., images or videos) that are stored in the user profile store 200. Additionally, the web server 250 may provide application programming interface (API) functionality to send data directly to native client device operating systems, such as IOS®, ANDROID™, WEBOS® or RIM®.

Example Process Flows

Figure 3:
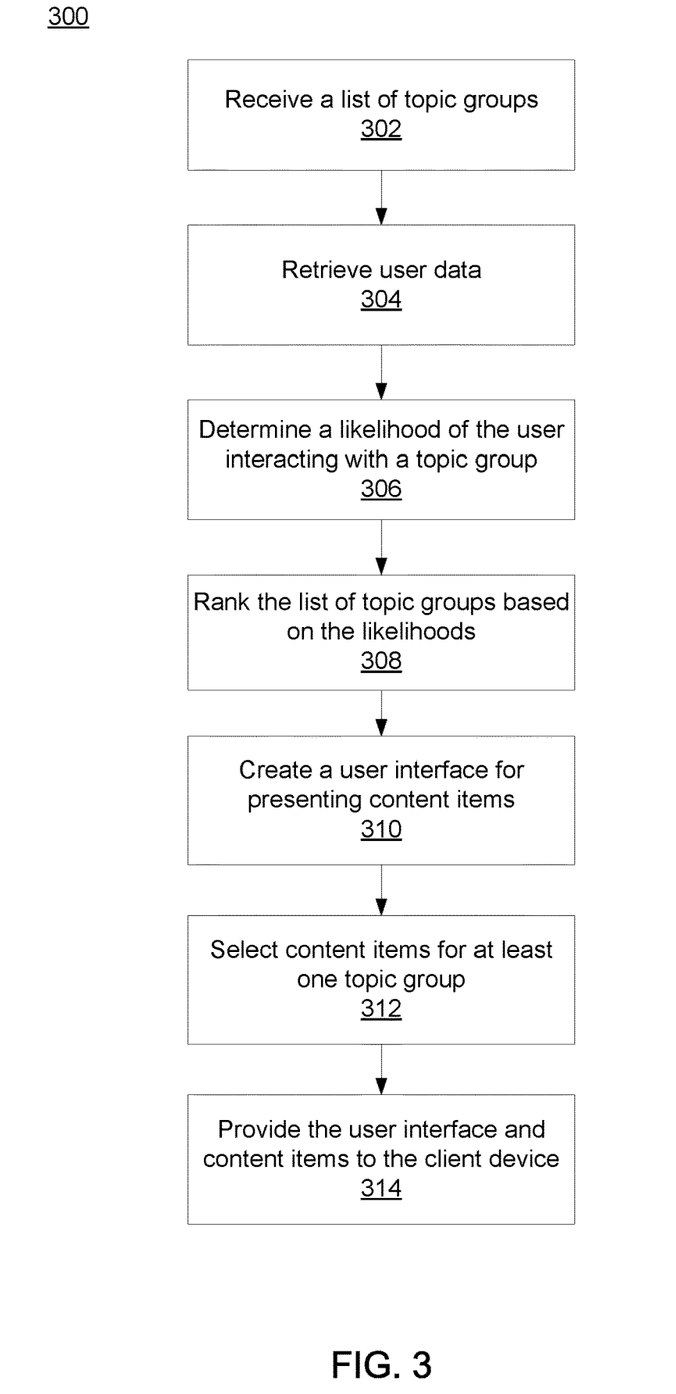
FIG. 3 is a flow diagram of ranking topic groups for presenting content items in topic-based feeds for display on a client device 110 according to one embodiment.

FIG. 3 is a flow diagram of ranking topic groups for presenting content items in topic-based feeds for display on a client device 110 according to one embodiment. In some embodiments, the process 300 is used by an online system such as the online system 140 described with reference to FIGS. 1-2. The process 300 may include different, fewer, or additional steps than those described in conjunction with FIG. 3 in some embodiments or perform steps in different orders than the order described in conjunction with FIG. 3.

The online system 140 receives 302 a list of topic groups, which can include groups for a particular user or just a general list of all topic groups. The receiving can also include accessing a stored collection of topic groups. A topic group corresponds to one or more topics and is used for organizing content items. Content items related to the topic(s) are organized into the corresponding topic group. For a topic group, the one or more topic group(s) to which the online system 140 corresponds may be configured by the online system 140 or a user. The list of topic groups can be predetermined, selected from a plurality of possible topic groups, or provided by the user. The list of topic groups can be the same or different for different users. For instance, the online system 140 can determine the list of topic groups for all users of the online system 140 or the online system 140 can customize the list of topic groups for individual users.

The online system 140 can also determine a plurality of possible topic groups and select one or more possible topic groups to create the list. For example, the plurality of possible topic groups can be preliminarily ranked, the highest ranked possible topic groups can be selected or the lowest ranked possible topic groups can be removed to create the list of topic groups.

The online system 140 can further provide the plurality of possible topic groups to the user, from which the user selects to create the list of topic groups. The user can further create a new topic group for inclusion in the list. In some embodiments, the online system 140 ranks only the list of topic groups. Other embodiments additionally rank the plurality of possible topic groups or the rest of the possible topic groups not included in the list.

The online system 140 retrieves 304 user data including user information data and user interaction data from the user profile store 200, the action log 220, the content store 240, or provided by an expert to the online system 140. The retrieved user data is used for determining probability of the user interacting with the topic groups, which is a basis for ranking the topic groups.

The online system 140 determines 306 a probability of the user interacting with the topic groups of the list. The online system 140 may determine a first probability of the user interacting with the topic group for the first time and/or a second probability of the user continuing interacting with the topic group. In some embodiments, the online system 140 combines the first probability and the second probability to determine a combined probability of the user interacting with the topic group. The retrieved user data is provided to a topic group classification and ranking model for determining the probability. The topic group classification and ranking model includes one or more classifiers that receive the user data and output a classification of the topic group as a probability of the user interacting (or not) with the topic group. In some embodiments, the one or more classifiers include a binary classifier that outputs either a positive classification or a negative classification. The positive (negative) classification indicates that the user will (will not) interact with the topic group. The output classification is associated with a confidence score which can be used to indicate a probability of the user interacting with the topic group. The one or more classifiers are associated with different weights and include different features that are also associated with different weights. The probability of a user interacting with a topic group is thus a weighted sum of the individual classifications and the associated confidence scores.

The online system 140 ranks 308 the list of topic groups according to the determined probability of the user interacting with the topic groups. The topic groups are ranked in an order from the most likely to the least likely that the user will interact with. For instance, a ranked order includes positively-classified topic groups ranked in a descending order according to the associated confidence scores and negatively-classified topic groups ranked in an ascending order according to the associated confidence scores. The online system 140 organizes content items according to the topic groups before providing them to the client devices 110.

The online system 140 generates 310 a user interface for presenting content items in topic-based feeds (i.e., content items organized into topic groups). The user interface includes a set of user interface elements (e.g., tabs, icons, drop-down menus, etc.) corresponding to one or more topic groups of the list. User interface elements can be generated for all or some of the topic groups included the list, such as for the highest-ranked topic groups. The online system 140 or users can configure the quantity of user interface elements for topic-based feeds to be included in the user interface. When traversing the user interface, users can access a topic feed including content items related to one or more topic(s) by interacting with the corresponding user interface element. For example, as illustrated in FIG. 4A, by clicking on the icon 406 "Home & Garden," a user is directed to a feed of content items related to the topic of home and garden.

The online system 140 selects 312 content items for at least one of the topic groups for which the user interface includes corresponding user interface elements. Thus, the content items to be presented in at least one topic-based feed are selected. For example, the online system 140 queries the one or more topics in the content store 210 to identify content items related to the one or more topics. The online system 140 may select content items for all topic feeds that can be accessed in the user interface or for the topic feed that is going to be presented to the user. In some embodiments, the content items have been previously tagged to certain topic groups and so the selection of content items for the topic-based feed includes selecting the content items tagged to that topic. The online system 140 also generally performs a ranking of all content items for the user based on probability of interest in each content item, so the online system further ranks content items in the topic based feeds and in the News Feed based on user interest and presents the content items in a ranked order with highest ranked first.

The online system 140 provides 314 the user interface and the selected content items to the client devices 110 for presentation, for instance, in response to a user's request. Users can adjust the ranking of the topic groups. For example, users can change the order of the user interface elements in the user interface to adjust the ranking of the topic groups. Users can also add additional topic groups, remove existing topic groups, or create new topic groups.

Each topic group can include one or more sub-topic groups each of which is related to one or more sub-topics. One of ordinary skill in the art would appreciate that methods and systems of ranking topic groups as described herein can also rank sub-topic groups.

Example User Interfaces

Figure 4B:
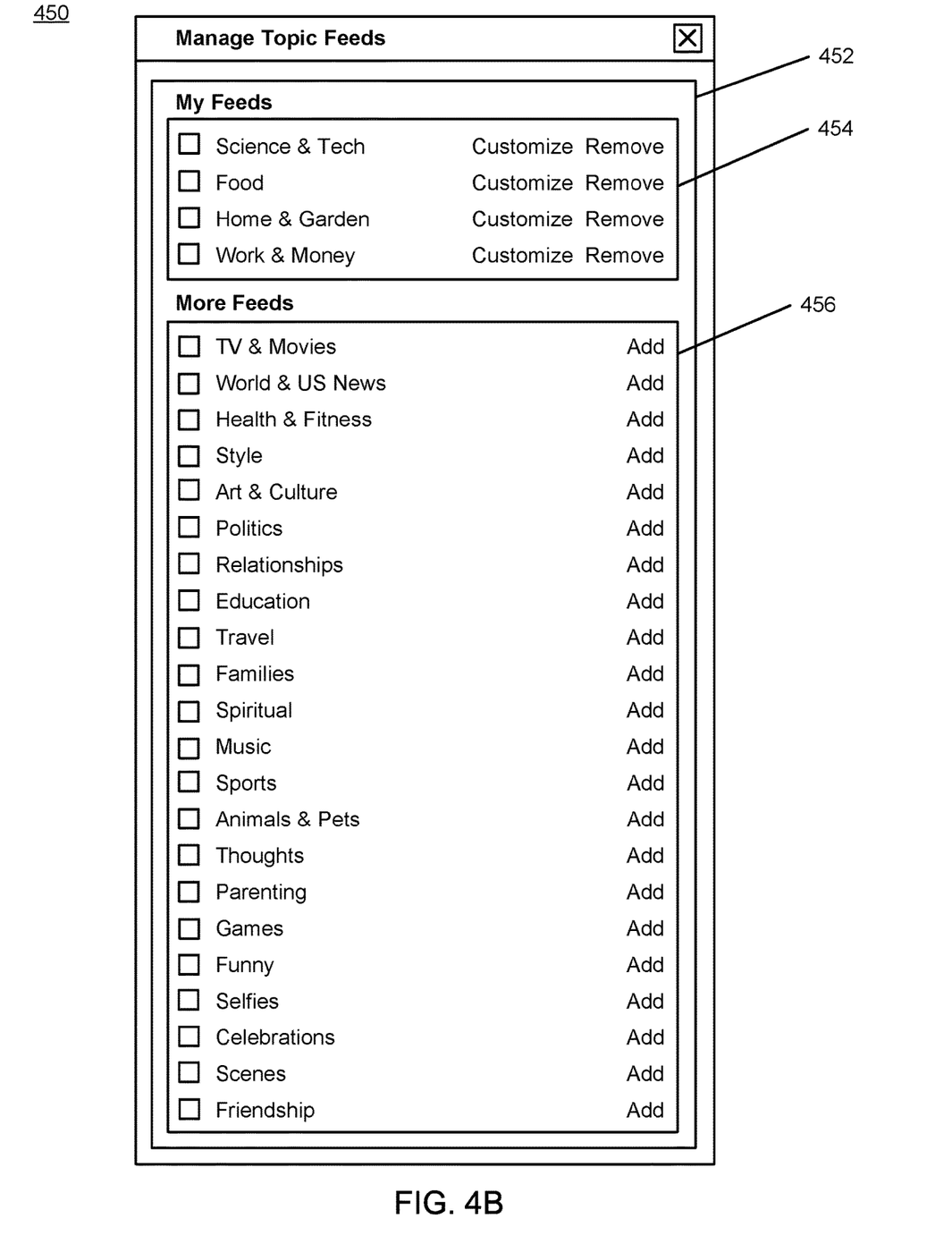

FIGS. 4A-B illustrate example user interfaces for presenting content items in topic-based feeds, according to one embodiment. As illustrated in FIG. 4A, the user interface 400 includes user interface elements 402, 404, 406, and 408 configured to allow the user to access different topic-based feeds "Science & Tech," "Food," "Home & Garden," and "Work & Money," respectively. Each topic-based feed corresponds to a topic group and presents content items related to the corresponding topic(s). As illustrated, the "Home & Garden" feed presents content items 410 and 412 that are both related to the topics of home and garden. More topic-based feeds can be accessed by additional icons corresponding to other topic groups. The user interface 400 further includes a user interface element 414 configured to allow the user to create and publish content items. When the user creates and publishes a content item using the user interface element 414 under the "Home & Garden" topic-based feed, the content item will be associated with the topics of home and garden and will be presented in the user's connection's "Home & Garden" topic-based feed. The online system 140 determines that the topic groups "Science & Tech," "Food," "Home & Garden," and "Work & Money," are the four highest-ranked topic groups for this particular user. However, the user can overwrite the ranking of the topic groups, add new topic groups or remove existing topic groups. For example, the user can drag and drop the tab 404 such that it is to the left of the tab 402 to configure that the topic group "food" is ranked higher than the topic group "Science & Tech."

The feed displayed on the screen in FIG. 4A can change to a different collection of content items depending on which topic group is selected, or the user can select the general "News Feed" tab 401 to see all content items selected for the user that are ranked according to the user's probability of having interest in the content items. In one embodiment, the topic feeds are filtered versions of the News Feed, such that the News Feed content items are filtered to only display content items on the particular topic. In other embodiments, there can be different content items available in the topic feeds that are not in the News Feed. In some embodiments, the user can select more than one topic to display more than one feed side by side on the screen or to mix content items for two or more different topics in a single feed.

Referring now to FIG. 4B, a user interface 450 allows the user to manage the topic-based feeds. The online system 140 ranks the list 452 of topic groups. The list 454 includes the highest-ranked topic groups for which user interface elements are created and included in the user interface 400 for accessing topic-based feeds. The list 456 includes lower-ranked topic groups for which user interface elements are not created. However, via the user interface 450, the user can add additional topic groups from the list 456 for which user interface elements can be created and topic-based feeds can be accessed on the user interface 400. In response to this adjustment, the online system 140 adjusts the ranking of the topic groups. In addition, this interaction information can be included in the training data to retrain the topic group classification and ranking model. The user can also remove one or more topic groups from the list 452, the corresponding existing user interface elements (e.g., user interface elements 402, 404, 406, 408) will be removed from the user interface 400 for presenting content items in topic-based feeds and topic-based feeds for those topic groups will be no longer accessible via the user interface 400.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, at an online system, a plurality of topic groups, each topic group corresponding to one or more topics, each topic group including content items that are tagged to that topic group;
   retrieving, by the online system, user data of a user relating to one or more of the topic groups;
   for each topic group, determining a probability of the user interacting with content items tagged to the topic group by applying one or more trained classifiers to the user data of the user, wherein the one or more trained classifiers comprise a binary classifier configured to receive the user data and to output an output classification, the output classification being either positive or negative in terms of whether the user is predicted to have an interest in the topic group;
   ranking the plurality of topic groups for the user according to the determined probability for the plurality of topic groups;
   generating a user interface including a feed of content items selected for the user for provision to a user device of the user, the user interface including one or more user interface elements corresponding to at least one of the plurality of topic groups that were ranked higher than other topic groups for the user;
   selecting a set of content items for the user that are tagged to the topic group of each of the one or more user interface elements;
   providing for display, by the online system to the user device of the user, the generated user interface with the feed of content items; and
   in response to receiving a selection by the user of one of the user interface elements, providing for display to the user a different feed that comprises the selected set of content items tagged to the topic group for the selected user interface element.

2. The computer-implemented method of claim 1, wherein the binary classifier is further configured to output a confidence score associated with the output classification, the confidence score indicating a probability of the user interacting or not interacting with the topic group.

3. The computer-implemented method of claim 1, wherein the one or more trained classifiers observe correlations between probability of the user interacting with the topic group and at least one of user information, click-based interaction information, post-based interaction information, and engagement-based interaction information.

4. The computer-implemented method of claim 1, wherein the user data of the user is user information associated with a user profile of a user, the user information comprising at least one of the user's demographic information, the user's geographical location, fans or followers of the user, fans or follows of a content item of the user, another user that the user follows or is a fan of, and another content item that user follows or is a fan of.

5. The computer-implemented method of claim 1, wherein the user data is click-based interaction information comprising at least one of the user clicking on a content item, the user indicating a preference for a content item, the user sharing a content item with another user, the user commenting on a content item, a type of a content item that the user interacted with, a topic of a content item that the user interacted with, and a token that the user used.

6. The computer-implemented method of claim 1, wherein the user data is post-based interaction information comprising at least one of the user posting a content item, a type of a content item that the user posted, a topic of a content item that the user posted, and a token that the user used.

7. The computer-implemented method of claim 1, wherein the user data is engagement-based interaction information comprising at least one of an amount of time the user spends on interacting with a content item, an amount of time the user spends on interacting with a topic group, a quantity of content items belonging to a topic group that the user interacts with, and a quantity of content items that a user has viewed.

8. The computer-implemented method of claim 1, wherein the user interface is configured such that the one or more user interface elements are arranged according to a ranked order of the plurality of topic groups.

9. The computer-implemented method of claim 1, wherein the set of content items tagged to the topic group are tagged by querying, from a plurality of content items stored at the online system, the one or more topics to identify one or more content items related to the one or more topics of a topic group, the content.

10. The computer-implemented method of claim 1, further comprising:
for each topic group, determining an updated probability of the user interacting with the topic group by applying the one or more trained classifiers to updated user data of the user, the updated user data including data about the user's engagement with content items of topic groups presented as user interface elements; and
re-ranking the plurality of topic groups according to the updated probability for the plurality of topic groups.

11. The computer-implemented method of claim 10, wherein the re-ranking is performed in response to a user request or is performed in response to detecting a predetermined period of time has lapsed.

12. The computer-implemented method of claim 1, further comprising:
determining a new topic group and a probability of the user interacting with the new topic group; and
in response to determining the determined probability for the new topic group greater than a threshold, generating and providing a suggestion to include the new topic group in the plurality of topic groups to the client device.

13. The computer-implemented method of claim 1, further comprising:
comparing a determined probability for a topic group of the plurality of topics to a threshold; and
in response to determining that the determined probability for the topic group less than a threshold, generating and providing a suggestion to remove the topic group from the plurality of topic groups to the client device.

14. The computer-implemented method of claim 1, wherein the one or more trained classifiers comprise a set of features including a feature representing a time period, and wherein the method further comprises:
determining, by the online system, a new topic group based on a current time representing a particular season of the year; and
providing, by the online system to the user device, a suggestion for the new topic group relating to the particular season of the year.

15. A non-transitory computer readable storage medium having instructions encoded thereon that, when executed by a processor, cause the processor to:
receive, at an online system, a plurality of topic groups, each topic group corresponding to one or more topics, each topic group including content items that are tagged to that topic group;
retrieve, by the online system, user data of a user relating to one or more of the topic groups;
for each topic group, determine a probability of the user interacting with content items tagged to the topic group by applying one or more trained classifiers to the user data of the user, wherein the one or more trained classifiers comprise a binary classifier configured to receive the user data and to output an output classification, the output classification being either positive or negative in terms of whether the user is predicted to have an interest in the topic group;
rank the plurality of topic groups for the user according to the determined probability for the plurality of topic groups;
generate a user interface including a feed of content items selected for the user for provision to a user device of the user, the user interface including one or more user interface elements corresponding to at least one of the plurality of topic groups that were ranked higher than other topic groups for the user;
select a set of content items for the user that are tagged to the topic group of each of the one or more user interface elements; and
provide for display, by the online system to the user device of the user, the generated user interface with the feed of content items; and
in response to receiving a selection by the user of one of the user interface elements, provide for display to the user a different feed that comprises the selected set of content items tagged to the topic group for the selected user interface element.

16. The non-transitory computer readable storage medium of claim 15, wherein the one or more trained classifiers observe correlations between probability of the user interacting with the topic group and at least one of user information, click-based interaction information, post-based interaction information, and engagement-based interaction information.

17. The non-transitory computer readable storage medium of claim 15, wherein the user interface is configured such that the one or more user interface elements are arranged according to a ranked order of the plurality of topic groups.

18. A computer program product comprising a non-transitory computer readable storage medium having instructions encoded thereon that, when executed by a processor, cause the processor to:

- receive, at an online system, a plurality of topic groups, each topic group corresponding to one or more topics, each topic group including content items that are tagged to that topic group;
- retrieve, by the online system, user data of a user relating to one or more of the topic groups;
- for each topic group, determine a probability of the user interacting with content items tagged to the topic group by applying one or more trained classifiers to the user data of the user, wherein the one or more trained classifiers comprise a binary classifier configured to receive the user data and to output an output classification, the output classification being either positive or negative in terms of whether the user is predicted to have an interest in the topic group;
- rank the plurality of topic groups for the user according to the determined probability for the plurality of topic groups;
- generate a user interface including a feed of content items selected for the user for provision to a user device of the user, the user interface including one or more user interface elements corresponding to at least one of the plurality of topic groups that were ranked higher than other topic groups for the user;
- select a set of content items for the user that are tagged to the topic group of each of the one or more user interface elements; and
- provide for display, by the online system to the user device of the user, the generated user interface with the feed of content items; and
- in response to receiving a selection by the user of one of the user interface elements, provide for display to the user a different feed that comprises the selected set of content items tagged to the topic group for the selected user interface element.

* * * * *